(12) United States Patent
Joo

(10) Patent No.: US 8,804,129 B2
(45) Date of Patent: Aug. 12, 2014

(54) METHOD AND APPARATUS FOR PERFORMING FILM THICKNESS MEASUREMENTS USING WHITE LIGHT SCANNING INTERFEROMETRY

(75) Inventor: Ki-Nam Joo, Gwangju (KR)

(73) Assignee: Mitutoyo Corporation, Kanagawa (JP)

( * ) Notice: Subject to any disclaimer, the term of this patent is extended or adjusted under 35 U.S.C. 154(b) by 176 days.

(21) Appl. No.: 13/464,155

(22) Filed: May 4, 2012

(65) Prior Publication Data
US 2012/0218560 A1 Aug. 30, 2012

Related U.S. Application Data

(63) Continuation-in-part of application No. 13/341,047, filed on Dec. 30, 2011, now abandoned.

(30) Foreign Application Priority Data

Jan. 26, 2011 (EP) ..................................... 11152186

(51) Int. Cl.
- *G01B 11/02* (2006.01)
- *G01N 21/41* (2006.01)
- *G01N 21/43* (2006.01)
- *G01R 23/16* (2006.01)

(52) U.S. Cl.
USPC .............. 356/497; 356/504; 356/517; 702/77

(58) Field of Classification Search
CPC ............... G01B 11/0675; G01B 11/06; G01B 9/02083; G01B 9/02084; G01B 9/0209; G01B 11/0616
USPC ...................... 356/497, 503, 504, 517; 702/77
See application file for complete search history.

(56) References Cited

U.S. PATENT DOCUMENTS

| | | | |
|---|---|---|---|
| 5,555,471 A | 9/1996 | Xu et al. | |
| 6,545,763 B1 | 4/2003 | Kim et al. | |
| 7,315,382 B2 | 1/2008 | De Groot | |
| 7,324,210 B2 | 1/2008 | De Groot et al. | |
| 7,612,891 B2 | 11/2009 | Wan | |
| 7,755,768 B2 | 7/2010 | Mansfield | |
| 2003/0133126 A1* | 7/2003 | Sarfaty et al. | 356/503 |

(Continued)

OTHER PUBLICATIONS

"Semiconductor Applications—FTIR Sampling Techniques Overview", Application Note, Pike Technologies, 2005.*

(Continued)

*Primary Examiner* — Gregory J Toatley
*Assistant Examiner* — Dominic J Bologna
(74) *Attorney, Agent, or Firm* — Greenblum & Bernstein, P.L.C.

(57) ABSTRACT

The invention relates to a method and an apparatus for measuring the thickness of a transparent film by broad band interferometry, comprising the steps of preparing a correlogram of the film by an interferometer, applying a Fourier transformation to said correlogram to obtain a Fourier phase function, removing a linear component thereof, applying a second integral transformation to the remaining non-linear component to obtain an integral amplitude function of said non-linear component, identifying the peak location of said integral amplitude function and determining the thickness of the film as the double value of the abscissa at said peak location considering a refractive index of a film which is dependent on wavelength. The last two steps may be replaced by identifying the peak locations of said integral amplitude function and determining the thickness of the films as the double values of the abscissas at the peak locations.

17 Claims, 5 Drawing Sheets

(56) References Cited

U.S. PATENT DOCUMENTS

| | | |
|---|---|---|
| 2004/0189999 A1 | 9/2004 | De Groot et al. |
| 2005/0078318 A1 | 4/2005 | De Groot |
| 2005/0088663 A1 | 4/2005 | De Groot et al. |
| 2008/0065350 A1* | 3/2008 | de Groot et al. ............ 702/166 |
| 2011/0090511 A1 | 4/2011 | Medicus et al. |

OTHER PUBLICATIONS

"Thickness-profile measurement of transparent thin-film layers by white-light scanning interferometry" SW Kim & GH Kim, Applied Optics, vol. 38, No. 28, Oct. 1, 1999.*

* cited by examiner

METHOD AND APPARATUS FOR PERFORMING FILM THICKNESS MEASUREMENTS USING WHITE LIGHT SCANNING INTERFEROMETRY

INCORPORATION BY REFERENCE

This application is a continuation-in-part (CIP) Application of commonly-assigned, co-pending, U.S. patent application Ser. No. 13/341,047, filed Dec. 30, 2011, which is based upon and claims the benefit of priority from European patent application No. 11152186.0, filed on Jan. 26, 2011, the disclosure of which is incorporated herein in their entirety by reference.

BACKGROUND OF THE INVENTION

1. Field of the Invention

This invention is related to the high speed topographic surface and tomographic film thickness profile measurements using white light scanning interferometry.

2. Description of Related Art

It is well known in the science and industrial fields that ellipsometry and spectroscopic reflectometry can be used for highly accurate film thickness measurements. Even though ellipsometry and reflectometry have been developed and improved with several techniques such as variable angles, polarizations and tuneable spectral bandwidth, however, they are typically based on a single point measurement which limits the measurement speed and lateral resolution.

White light scanning interferometry (WLI) has been developed to measure the topographic surface height profile of a sample. WLI uses a low temporal coherence source meaning the interference appears when the path lengths of two interferometer arms are the same, as depicted in FIG. 1. Its low temporal coherence solves the ambiguity problem found in phase shifting interferometry (PSI) and makes absolute position measurements possible by a highly accurate scanning motion.

The result of a WLI measurement is a correlogram for each camera pixel. The height information of each pixel can be found by analyzing each correlogram. An important feature of WLI is that the optical spectrum of the source, which relates to the whole system, can be obtained.

This spectrum is found when the correlogram is analyzed in the Fourier domain.

This Fourier transform analysis has been used for the film thickness measurements by investigating the phase and amplitude in the Fourier domain in the prior art. U.S. Pat. No. 6,545,763 to Seung Woo Kim et al describes a method for calculating film thickness and surface profile from Fourier transform of a measured correlogram. This approach makes use of the spectral phase in the Fourier domain which is compared to a theoretical phase generated by preliminary knowledge of a film (i.e. a refractive index) and modelling.

An optimization technique is used to minimize the errors between the measured and theoretical phases and thus the surface height (h) and film thickness (d) are calculated. This approach can measure the film thickness below 1 µm.

However, two disadvantages to this approach are that the two-dimensional optimization process (h, d) is time consuming and setting the scanning range of h and d during the optimization makes real time measurements impossible.

U.S. Pat. No. 7,612,891 to Der-Shen Wan shows another method for measuring films wherein the Fourier amplitude, rather than the phase, is used as a comparison parameter between the measurement and the theoretical model.

The fundamental principle is similar to spectroscopic reflectometry, but the difference is in the methodology of the spectral density functions.

Spectroscopic reflectometry uses a spectrometer to analyze the spectral density function while this patent method measures the spectral density function by the Fourier transform of the correlogram (obtained from WLI). This technique is called Fourier transform spectroscopy. The smooth variation of Fourier amplitude caused by a very thin film can allows more reliable thickness measurements when compared to Fourier phase method.

Other methods using the Fourier amplitude are shown in the U.S. Pat. No. 7,755,768 to Daniel Mansfield. Here, a function (called the helical conjugate function), based on the Fourier amplitude, is defined. The film thickness is calculated by optimizing this function compared to the theoretical value.

However, in both cases, the preliminary experiments with the reflectance standard such as silicon show that these methods are limited due to their slow measurement speed and in its possible applications.

Still another method for measuring the film thickness combines the variable angle micro-ellipsometry principle with WLI as shown in U.S. Pat. No. 7,315,382 and U.S. Pat. No. 7,324,210 to Peter J. De Groot.

This approach uses a high numerical aperture (NA) objective to provide a range of incident angles, which is mathematically resolved by Fourier analysis of the correlogram. The angle-resolved analysis is similar to the Fourier phase method because the optimization with the theoretical model is the same.

But instead of the broadband source, this method uses a narrowband source with high NA objectives to obtain the amplitude and phase according to the incident angles. Thus this method must be applied to the high NA objectives, which have a wide range of incident angles.

SUMMARY OF THE INVENTION

In summary, previous film thickness measurement techniques are all based on the theoretical modelling of the correlogram, Fourier amplitude, Fourier phase, and their modifications. In particular, U.S. Pat. No. 6,545,763 shows a method for measuring the thickness of a film that is transparent for light within a frequency range by using white light interferometry. This method can be more widely used for many applications because it does not have any constraints such as preliminary experiments with the standard samples or the use of high NA objectives.

The method has the following steps:

preparing the film correlogram by using an interferometer adapted for the said frequency range, applying a Fourier transformation to the correlogram to obtain a Fourier phase function, and optimising a model to fit to the phase function to determine the film thickness and the surface height.

However, this optimization procedure is a time consuming process because of two parameters, independent of the methodology, so efficient reduction of the optimization searching range.

The aim of the present invention is to provide a method allowing to performing measurements with substantial higher speeds.

The present invention provides a method of the kind referred to above but comprising further the steps: removing a linear component of the Fourier phase function to obtain a non-linear component of said Fourier phase function; applying a second integral transformation to said non-linear component to obtain an integral amplitude function of said non-linear component; identifying the peak location of said integral amplitude function; and determining the thickness of the film as the double value of the abscissa at the peak location considering a refractive index of a film which is dependent on wavelength.

This method allows a faster measurement process as no optimisation process must be performed.

The present invention provides also an apparatus for measuring the thickness of a film that is transparent for light within a frequency range by using white light interferometry.

The apparatus comprises of an interferometer adapted for white light interferometry within said frequency range which is adapted to generate a correlogram.

The apparatus also comprises of a computer adapted to perform a Fourier transformation to said correlogram to obtain a Fourier phase function and remove the linear component of said Fourier phase function to obtain a non-linear component of said Fourier phase function.

In addition, the computer is adapted to apply a second integral transformation to said non-linear component to obtain an integral amplitude function of said non-linear component, to identify the peak location of said integral amplitude function and to determine the film thickness as the double value of the abscissa at the peak location considering a refractive index of a film which is dependent on wavelength.

The invention also can be extended to perform the measurement of the thicknesses of multiple layers.

Although the method is able to be applied with light within different frequency ranges, like UV or IR, it is preferred that the frequency range used in the method is visible light, preferably white light. Hence said embodiment also provides an apparatus of the kinds referred to above; wherein the interferometer has a light source for generating visible light, preferably white light.

Several integral transforms may be used in the method described above, like a Laplace transform or a Hilbert transform as the second integral transformation, but it is preferred that the second integral transform is a Fourier transformation. As the Fourier transform is to be executed by a digital computer, it is preferred that it is performed by a using a fast Fourier transform (FFT). This counts also for the second integral transformation if this is a Fourier transform.

The above method has less accurate results for film thicknesses below a certain value determined by the spectrum of the optical source. Hence a preferred embodiment proposes a method of the kind referred to above but after the determination of the film thickness, a test is performed to determine if the calculated thickness is less than a threshold. If the calculated thickness is less than the threshold, the non-linear component of said Fourier phase function is compared with a mathematical model of the non-linear component of said Fourier phase function as a function of the film thickness only. Thus, the value of the film thickness is determined as the thickness for which the mathematical model of the non-linear component of said Fourier phase function is as close as possible to the obtained value of said non-linear component of said Fourier phase function.

The determination of the threshold does not always take place with the preferred robustness. This is due to the fact that an incorrect maximum of the FFT spectrum may be selected as the estimate of the film thickness is determined. Hence a preferred embodiment provides a method of the kind referred to above wherein the thickness of the film is estimated by a determination of the distance between adjacent extremes in the non-linear component of said Fourier phase function, such that if no adjacent extremes are found or the distance between the extremes is larger than a predetermined value the estimated thickness is smaller than the threshold.

These last steps allow an accurate determination of the thin film thickness below the threshold as mentioned above.

The time required to perform this determination is longer than that required for the method described beforehand, leading to a slower process, albeit with a higher accuracy for film thicknesses.

The second part of this method bears some similarity with the method as described in U.S. Pat. No. 6,545,763. However in this prior art document the optimisation process is performed with two variables, both film thickness (d) and the surface height (h), while the present invention uses only a single variable, that is the film thickness. Further, said method can also be used in situations when the film thickness is larger than the threshold value. This also implies that this method can be used as more accurate method base on the determination of the thickness through the integral transform and the peak detection. In this case, this thickness and uncertainty determined by the integral transformation are used as an initial guessing value and the scanning range of the optimisation, respectively.

As stated above, the second step (optimisation) is relatively time consuming. To make this step faster, a further embodiment proposes to use only the values of the thickness within a range using the thickness and the uncertainty determined by the preceding method (integral transformation). For thin film measurements, the threshold value of the integral transformation method can limit the searching range of the optimisation. Due to these constraints of the search range, the number of samples to be searched is reduced considerably.

The above methods lead to determination of the film thickness only. Often it is also required to determine the surface height profile that the film is on.

Hence a further preferred embodiment provides a method of the kind referred to above to determine the thickness of the film and after determination of the film thickness, the surface height is calculated by substituting d in Eq. (4) with the knowledge of $r_1$, $r_2$ and $n_1$ to obtain the phase after which the surface height is calculated by substitution of the phase in Eq. (3).

This also allows the film height profile to be determined by adding the calculated film thickness to the calculated surface height profile.

This preferred embodiment also provides an apparatus containing a computer adapted to calculate the surface height by substituting d in Eq.(4) with the knowledge of $r_1$, $r_2$ and $n_1$ to obtain the phase and to calculate the surface height by substitution of the phase in Eq (3).

Another possibility to calculate the height of top of the (semi)-transparent layer is by a method of the kind referred to above wherein after the determination of the thickness of the transparent layer, the complex reflection spectrum contribution of the transparent layer is determined Eq. (4), the contribution of the transparent layer to the correlogram is removed by division of the Fourier transformed correlogram by the complex reflection spectrum contribution of the transparent layer Eq (4.). Further the height is preferably determined by processing of the resulting Fourier transformed correlogram by the method as described in US-A-2011/0090511.

This embodiment is based on the assumption that the influence of the transparent layer to the Fourier transform of the correlogram can be represented by a complex term representing the reflection spectrum of said layer.

The invention is applicable to several kinds of interferometers for white light interferometry, such as the Mirau type, Michelson type and Linnik type.

Finally, the invention also provides a carrier for digital data, carrying a program to perform the steps of a Fourier transformation to a correlogram to obtain a Fourier phase function and the removal of a linear component of said Fourier phase function to obtain a non-linear component of said Fourier phase function.

The program also applies the integral transformation to said non-linear component to obtain an integral amplitude function of said non-linear component, to identify the peak location of said integral amplitude function of said integral amplitude diagram and to determine the film thickness as the double value of the abscissa at the peak location considering a refractive index of a film which is dependent on wavelength.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 2A:
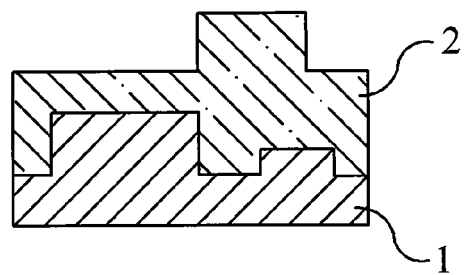
FIGS. 2A and 2B are cross sectional views of films and substrates.

FIG. 2A shows a cross sectional view of a non-transparent substrate 1 onto which a semi-transparent film 2 has been provided. The present invention aims to measure the thickness of the film 2, initially independent from the height profile of the substrate 1, but in a special embodiment also together with the height profile.

Figure 2B:
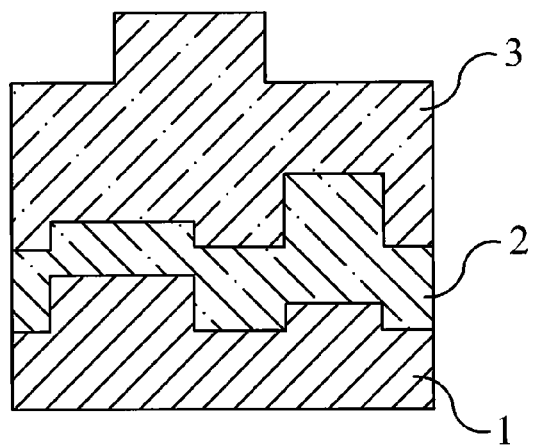

Further, FIG. 2B shows a view similar to FIG. 2A, where a second semitransparent layer 3 has been applied on the first semitransparent layer 2. The refractive index of the second layer 3 is different from that of the first transparent layer 2.

Figure 1:
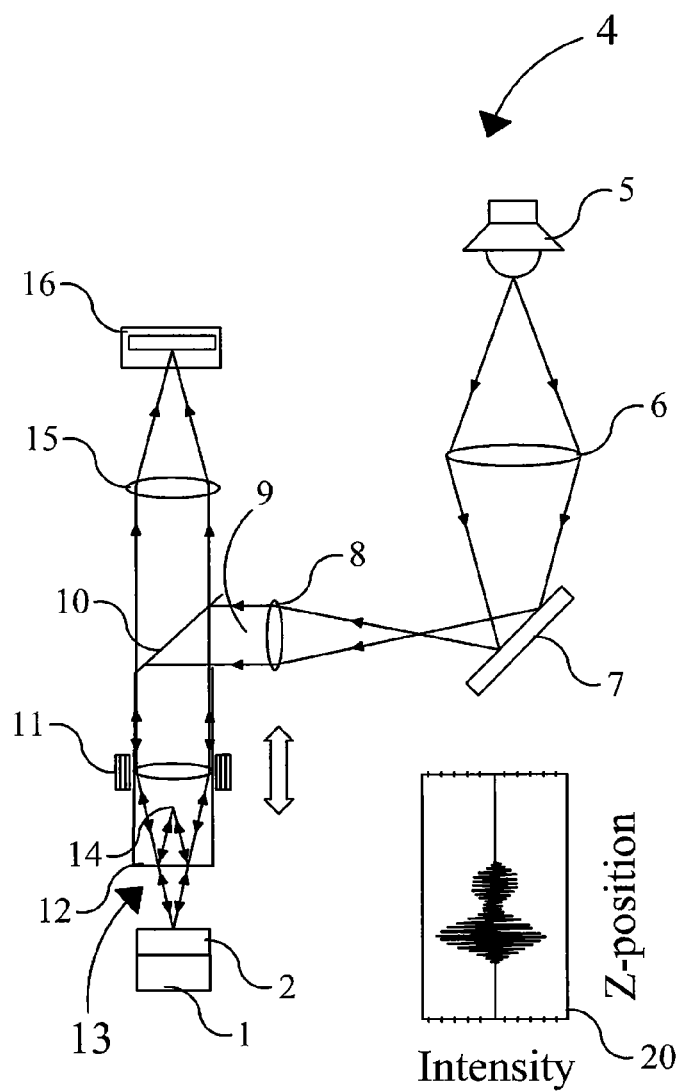
FIG. 1 is a diagram of a Mirau interferometer in an arrangement for measuring the thickness of a film on a substrate.

FIG. 1 depicts an interferometer of the Mirau type, denoted in its entirety by 4. This interferometer 4 comprises of a light source 5, adapted to generate white light, a first lens 6, a first mirror 7 and a second lens 8, these units being adapted to generate a parallel light beam 9. The parallel beam 9 may also be generated by other means. The parallel beam 9 is reflected by a beam splitter 10 and the reflected beam 10 passes through an objective 11 before it reaches a second beam splitter 12. Part of the beam is reflected from the beam splitter 12, and then reflects from a reference mirror 14.

The other part of the beam 13 passes through the beam splitter 12 and reflects from the substrate 1 and film 2. The beam reflected from the reference mirror 14 then reflects from the beam splitter 12. The beam reflected from the substrate 1 and film 2 passes through the beam splitter 12.

Both beams then interfere and pass through the objective 11, the beam splitter 10 and the lens 15 to reach the optical sensor 16. The signal of each of the pixels of the optical sensor 16 is read out. Further the reference mirror 14 is shifted over a small range in the direction of the optical axis. The signal of each of the pixels of the optical sensor 16 is read out to obtain a signal, which is a correlogram as depicted in box 20 in FIG. 1.

The structure described so far belongs to the prior art. Now the processing of this correlogram and the theoretical background thereof will be explained.

This invention describes the algorithm and measurement procedure of high speed and efficient film thickness and surface profile measurements using white light scanning interferometry. The film thickness measurement includes a method with a possible addition. In the method a rough estimation for high speed measurements (integral transformation method) is performed. In the possibly following addition a fine measurement based on the one-dimensional optimization of the nonlinear Fourier phase (optimization method) is carried out.

After the film thickness is measured, it is applied to the correlogram and the surface profile is calculated. In this manner, the thickness profile and surface profile are simultaneously obtained.

The correlogram of WLI (Iw) is the summation of monochromatic interference intensities given in the wavelength range from $\lambda_1$ to $\lambda_2$, $$I_W = \int_{k_1}^{k_2} I_0[1 + \gamma\cos(2k(h-z) - \Delta\phi)]f(k)dk \quad (1)$$

where k is the wave number ($2\pi/\lambda$), $I_0$ is the nominal intensity, $\gamma$ is the visibility function determined by the system, f(k) is the source spectral density function, h is the surface height, and z is the scanning position value in the vertical axis. In Eq. (1), $\Delta\phi$ is the additional phase caused by the difference between reference and measurement surface reflectances and, in this invention, is mainly due to the phase from the film structure as seen in FIG. 2.

In order to analyze the correlogram and obtain the phase in the spectral domain, a Fourier transform is applied to Eq. (1). This Fourier transform is performed practically using a Fast Fourier Transform (FFT).

After the FFT, the Fourier phase ($\phi$) is $$\phi = -2kh + \Delta\phi \quad (2)$$

The phase difference, $\Delta\phi$, is related to the total reflectivity, when multiple reflections of the film occur, such as with a typical single layer film.

This relationship is based on the multiple interferences of the film and is dependent of the material properties of the sample, the wavelength of the source, and the film thickness.

Thus, Eq. (2) becomes $$\phi = -2kh + \Delta\phi = -2kh + \angle\mathfrak{R}(d,k) \quad (3)$$

The symbol $\angle\mathfrak{R}$ represents the phase of the total reflectivity, $\mathfrak{R}$, which is a periodic function whose periodicity is related to the film thickness, d.

The reflectivity, $\mathfrak{R}$, is $$\mathfrak{R}(d,k) = \frac{r_1 + r_2\exp(-j2n_1kd\cos\theta_1)}{1 + r_1r_2\exp(-j2n_1kd\cos\theta_1)} \approx \frac{r_1 + r_2\exp(-j2n_1kd)}{1 + r_1r_2\exp(-j2n_1kd)} \quad (4)$$

where $r_1$ and $r_2$ are the reflectivities from the upper and lower surfaces, and $n_1$ is the refractive index of the film.

In case of using a low NA objective, the incident angle of the light, $\theta_1$, can be assumed as 0 and the NA effect of objective is negligible.

Although the explicit form of ∠ℜ can not be easily obtained from Eq. (4), it is possible to predict and confirm that the periodicity of exp(−j2n₁kd) also appears in ∠ℜ because of the characteristics of the periodic functions. Therefore, if the period of the phase is experimentally detected, d can be calculated from the period of exp(−j2n₁kd) with prior knowledge of the film refractive index, $n_1$. To detect the period of ϕ, an integral transformation can be used.

In this invention, Fourier transform, practically FFT is used as an example. The FFT actually determines the frequency instead of the period. This method of calculating d (the film thickness) is called the FFT method in this invention.

It must be noted that this FFT is different from the FFT of the correlogram to obtain the Fourier phase, ϕ.

Figure 3:
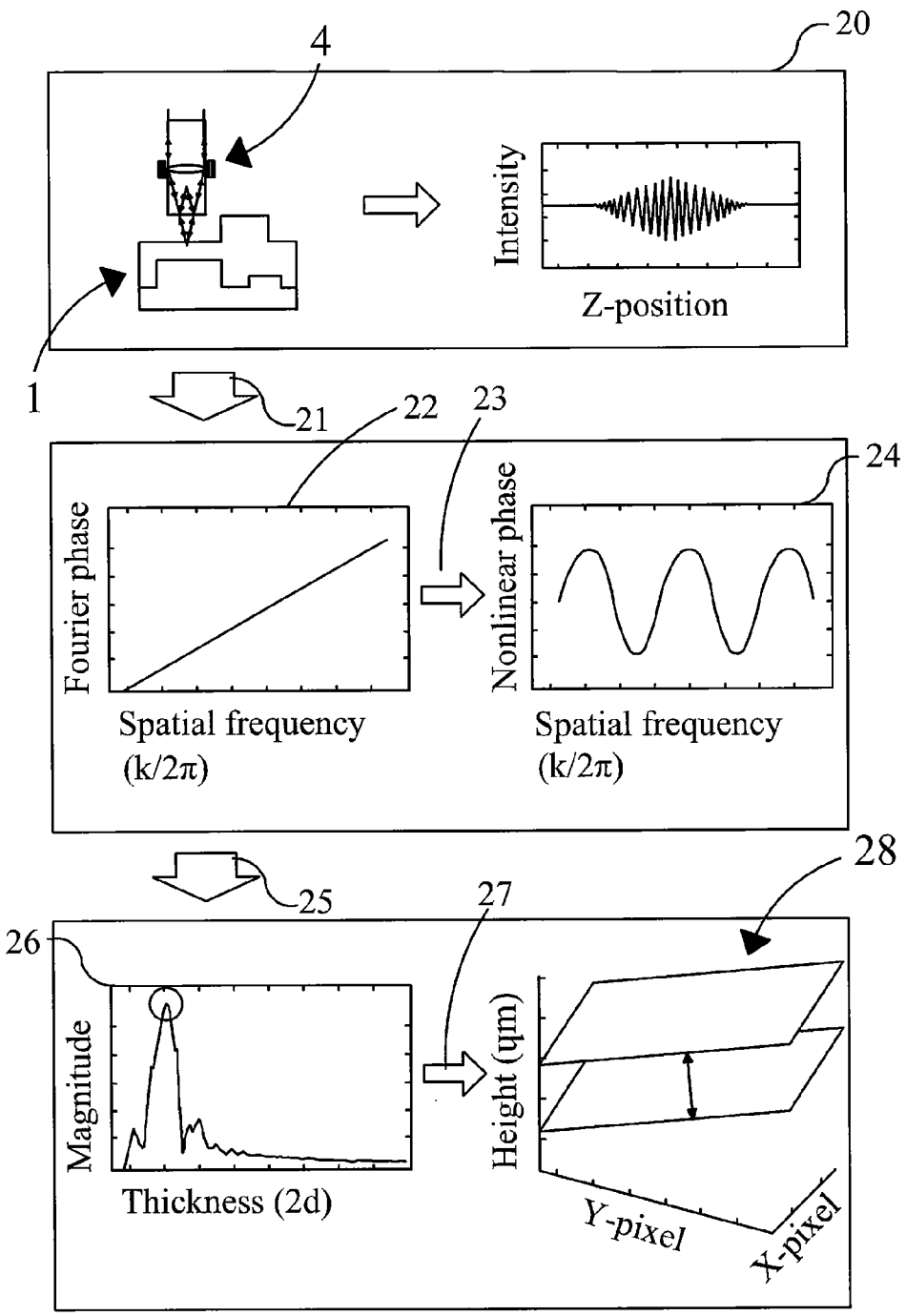
FIG. 3 is a series of diagrams showing several stages of the method according to the present invention.

The measuring procedure of the FFT method is as seen in FIG. 3 and explained below.

First, the phase ϕ 22 is obtained from the correlogram 20 by Fourier analysis implied as a FFT 21 as depicted in FIG. 3. In step 23 the phase's linear slope, $\phi_{linear}$ is subtracted to obtain the nonlinear phase, $\phi_{non}$ 24.

$$\phi_{non} = \phi - \phi_{linear} = \angle\mathfrak{R}_{non} \quad (5)$$

This subtraction results in the nonlinear phase of ℜ (∠ℜ$_{non}$), which is a function of only d as seen in Eq. (3) and Eq. (4). Next, an FFT 25 is applied to $\phi_{non}$ 24 in the spatial frequency domain (n₁k/2π) due to the wave number, k, dependency of $n_1$. The dominant frequency component of the signal 26 obtained by the FFT is detected by simple peak detection 27. The location of this frequency component is 2 times d, the film thickness 28, after a value for $n_1$ is applied. Typically the value for the refractive index is applied using a look up table.

The FFT method can measure the film thickness 28 with high speed compared to the prior art in both thin and thick films because of its simple calculation, even if the correlograms are not overlapped. However, $r_1$ and $r_2$ are variable parameters according to k and the dependency can deteriorate the accuracy of determining the phase period found by the FFT method. The error caused by these parameters originates from the material properties of the film and the sample substrate. Practically, this systematic error could be pre-determined and calibrated out with knowledge of the material properties and the film thickness.

The fundamental limitation of the FFT method comes from the frequency detection limit in FFT. Typically, for very thin films, the FFT method cannot give an accurate frequency value because the nonlinear phase, $\phi_{non}$ 24, will not show a complete period. Thus the FFT will not give the correct thickness. In other words, the frequency peak containing the film thickness information in the Fourier domain is close to the DC peak and possibly even overlapped with it.

Figure 4:
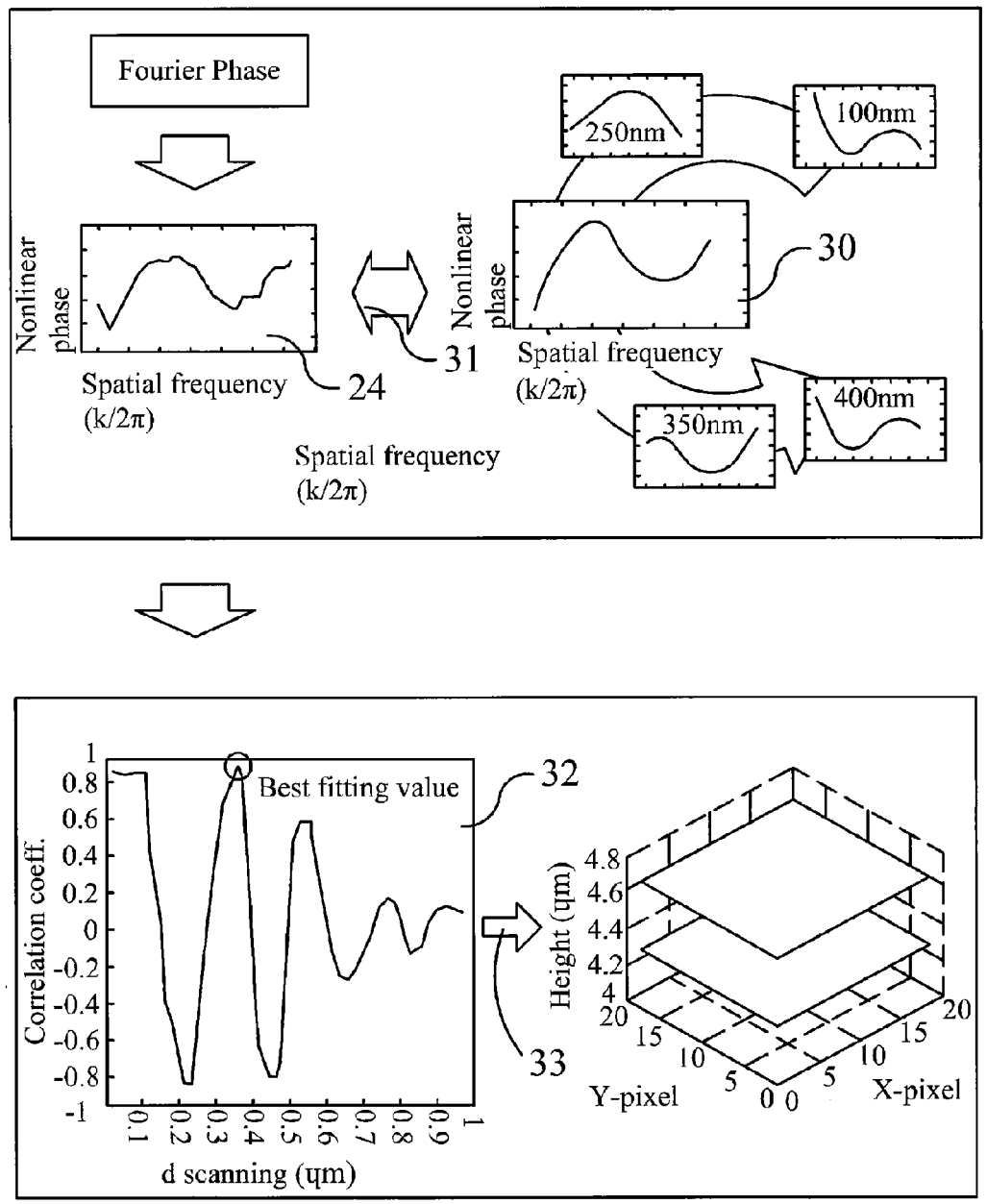
FIG. 4 is a series of diagrams showing two stages of an additional method according to the invention.

This limitation is determined by the spectral bandwidth of the optical source. In this case, an optimization method is used to extract the thickness as shown in FIG. 4. A theoretical nonlinear phase, $\phi_{non}$ 30, generated from the theory and foreknowledge of the film, is compared in step 31 to the nonlinear term of the measurement phase 24 while varying the thickness values. Several methods such as least squares fitting, correlation, and any other optimization techniques can be applied to minimize the difference between the theoretical and measurement results to calculate the best fitting value of d 32. In this invention, the correlation coefficients between two nonlinear phases are calculated and the maximum value is selected in step 33 to determine d.

The main problem issue with the optimization method is the time taken searching for the best fitting value. Even so, the optimization method is advantageous because it has the capability to measure the film thickness less than 100 nm.

There are two approaches to reduce the optimization time. One is to reduce the number of searching parameters. In U.S. Pat. No. 6,545,763, where the Fourier phase based on the optical spectrum is used for the optimization, the surface height and the film thickness are the variable parameters and the optimization error function is two-dimensional. Two-dimensional optimization likely needs much more time to obtain the best fitting values compared to the one-dimensional optimization. In this point of view, the optimization process in this invention improves the measurement speed over the method in U.S. Pat. No. 6,545,763 as it only uses a single parameter.

The other approach to reduce the optimization time is to adjust and confine the searching range using either some constraints or inputting an initial value. In this invention, the measurement result of the FFT method is used to reduce the total searching range of the optimization. The thickness determined by the FFT method is used for the initial value and its uncertainty defines the searching range. Moreover, the minimum measurable thickness of the FFT method is the maximum limit of the searching range in the optimization method when very thin film structures are measured.

Figure 5:
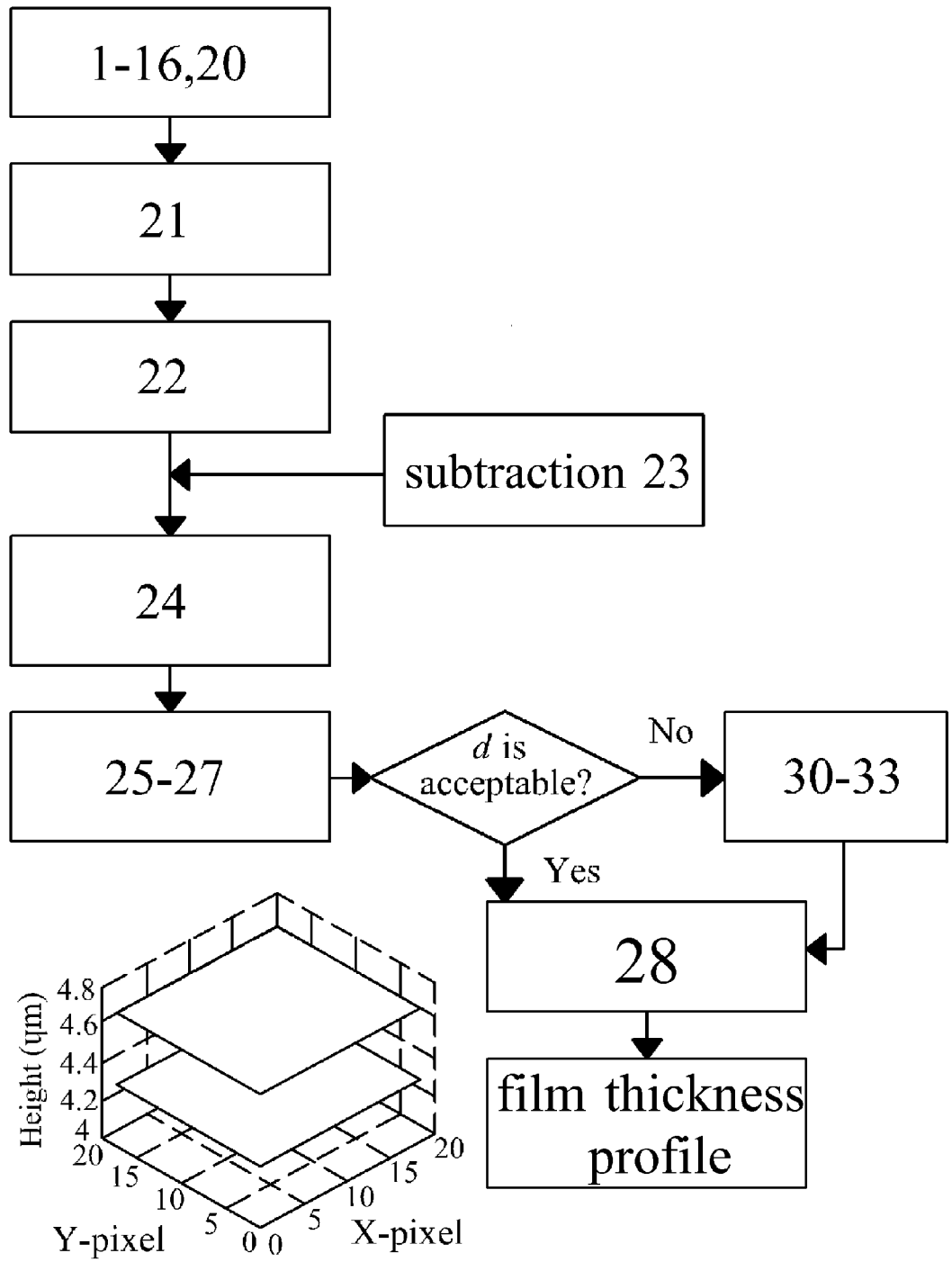
FIG. 5 is a flow chart of two methods according to the invention.

The embodiment of this invention is a film measurement using WLI, including two components, the FFT method and the optimization method, as illustrated in FIG. 5. The whole measurement procedure starts with a film correlogram 20 acquisition using WLI as shown in FIG. 1. Then the correlogram 20 is analyzed with a FFT 21 and only the phase 22 corresponding to the spectral density function is extracted for the next step. In order to separate the film thickness from the surface height, the linear phase term is subtracted 23 from the Fourier phase 22.

The remaining nonlinear phase 24, which is a function of thickness only, becomes the input to the FFT 25 method. After applying the FFT method, the next step is determined by the validity of the measurement result 26. For example, the judgment for the results of FFT method can be implemented by the magnitude of the peak shown in the graph 26 of FIG. 3 or the minimum measurable thickness determined by specification of the system and preliminary experimental results.

If the FFT method successfully determined the film thickness 28, then that thickness 28 is then used to calculate the surface height and ultimately both the surface and film thickness profiles are obtained. If the FFT method was not successful, the optimization method 31, 32, 22 is used. Then, the FFT measurement result 28 and the minimum measurable thickness of the FFT method are used in the optimization method 31, 32, 33 as constraints. Then the best value of the film thickness 28 is determined by one-dimensional optimization and the film thickness profile is finally calculated.

In the method described above the selection of the method for calculating the thickness of the layer is determined by using the FFT method. However it is also possible to estimate the thickness of the film by a determination of the distance between adjacent extremes in the non-linear component of said Fourier phase function, such that if no adjacent extremes are found or the distance between the extremes is larger than a predetermined value the estimated thickness is smaller than the threshold.

Calculation of the height may take place is elucidated above, but it is also possible to a method as described in US-A-2011/0090511.

The final stage of the measurement is to combine the film thickness measurement results with the original correlogram to obtain the top and bottom surface profiles simultaneously. After determining the thickness, d, by the FFT and optimization method, ∠ℜ can be calculated by substituting d in Eq.

(4) with the knowledge of $r_1$, $r_2$ and $n_1$. Then the phase, which relates only to the surface height, h, can be extracted from subtracting $\angle \Re$ from the original phase.

Any algorithm to measure the surface height in WLI can then be applied to this corrected phase and its modified correlogram. This measurement procedure is performed pixel by pixel of the image recording device (such as CCD).

Consequently, the top and bottom surface profiles of the sample are simultaneously obtained when the standard WLI algorithms are applied to the correlogram which has the film phase removed.

Even though the FFT method is introduced as a film thickness measurement technique in this invention, it can be used as a method to determine the phase difference between any pulses in principle. In case of electronic pulses, this FFT method can determine the time delay between two or more pulses through the same procedure explained above. In case of optical pulse such as time of flight methods, the FFT methods can measure the distance according to the principle of time of flight.

As stated before, there is another possibility to calculate the height or the profile of the substrate onto which the transparent layer has been applied. A first option is to determine the contribution of the transparent layer to the correlogram or to the Fourier transform thereof. This contribution is dependent on the thickness of the layer, so that initially the thickness must be determined, preferably through one of the methods discussed above and subsequently. The Fourier spectrum can be written as $$z(f) = \text{Amplitude}(f) * \exp(-i \text{ phase}(f)).$$

According to the method Amplitude(f) is replace by the light spectrum and the phase is the phase as measured with the film phase contribution subtracted. The result is a Fourier spectrum that equals a Fourier spectrum of a sample with the same height but without a film on top. Consequently the height can be determined by using methods applicable for these calculations as for instance as described in US-A-2011/0090511.

The procedure described above of this invention can be performed by a computer which has a CPU, ROM and RAM that executes a computer readable program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for measuring a thickness of a transparent film within a specific light frequency range by using broad band interferometry within the frequency range, the method comprising:
    preparing a correlogram of the film by using an interferometer adapted for broad band interferometry within the frequency range;
    applying a Fourier transformation to the correlogram to obtain a Fourier phase function;
    removing a linear component of the Fourier phase function to obtain a non-linear component of the Fourier phase function;
    applying a second integral transformation to the non-linear component to obtain an integral amplitude function of the non-linear component;
    identifying a peak location of the integral amplitude function; and
    determining the thickness of the film as a double value of an abscissa at the peak location considering a refractive index of the film which is dependent on wavelength,
    wherein after the thickness of the film is determined, the thickness of the film is tested to determine whether the determined thickness is less than a threshold; and
    when the determined thickness is less than the threshold, the non-linear component of the Fourier phase function is compared with a mathematical model of the non-linear component of the Fourier phase function as a function of the film thickness only, and the film thickness is determined to be the thickness for which the mathematical model of the non-linear component of the Fourier phase function is closest to the obtained non-linear component of the Fourier phase function.

2. The method according to claim 1, wherein the frequency range used in the method is visible light.

3. The method according to claim 2, wherein the visible light is white light.

4. The method according to claim 1, wherein the second integral transformation is a Fourier transformation.

5. The method according to claim 1, wherein the Fourier transform transformation is executed by using a Fast Fourier Transform.

6. The method as claimed in claim 1, the thickness of the film is estimated by a determination of a distance between adjacent extremes in the non-linear component of the Fourier phase function, such that when no adjacent extremes are found or the distance between the extremes is larger than a predetermined value, the estimated thickness is smaller than the threshold.

7. The method according to claim 1, wherein only the thickness within a range around the determined thickness is used as a search range within which the mathematical model of the non-linear component of the Fourier phase function is determined and compared with the obtained non-linear component of the Fourier phase function.

8. The Method according to claim 1, wherein after determining the thickness, a surface height is calculated by substituting d in $$\Re(d, k) = \frac{r_1 + r_2 \exp(-j2n_1 kd \cos\theta_1)}{1 + r_1 r_2 \exp(-j2n_1 kd \cos\theta_1)} \approx \frac{r_1 + r_2 \exp(-j2n_1 kd)}{1 + r_1 r_2 \exp(-j2n_1 kd)}$$

with knowledge of $r_1$, $r_2$ and $n_1$ to obtain a phase,
then the surface height is calculated by substitution of the phase in $$\phi = -2kh + \Delta\phi = -2kh + \phi \Re(d,k), \quad 5$$

wherein R respresents reflectivity, d represents the film thickness, k represents a wave number, $r_1$ and $r_2$ respectively represent reflectivities from upper and lower surfaces, j represents imaginary unit, $n_1$ represents the refractive index of the film, $\theta_1$ represents an incident angle of light, h represents the surface height, $\Delta\phi$ represents phase difference, and $\angle R$ represents a phase of total reflectivity.

9. The method according to claim 1, wherein the thickness of at least two films, which are transparent for a specific frequency range and have mutually different refractive indices, is measured by using broad band interferometry within the frequency range.

10. The method according to claim 1, wherein after the determination of the thickness of a transparent layer, a complex reflection spectrum of the transparent layer is determined by $$\Re(d,k) = \frac{r_1 + r_2\exp(-j2n_1kd\cos\theta_1)}{1 + r_1 r_2\exp(-j2n_1kd\cos\theta_1)} \approx \frac{r_1 + r_2\exp(-j2n_1kd)}{1 + r_1 r_2\exp(-j2n_1kd)},$$

a contribution of the transparent layer to the correlogram is removed by division of the Fourier transformed correlogram by the complex reflection spectrum of the transparent layer, and a surface height is determined by processing of the resulting Fourier transformed correlogram, wherein R respresents reflectivity, d represents the film thickness, k represents a wave number, $r_1$ and $r_2$ respectively represent reflectivities from upper and lower surfaces, j represents imaginary unit, $n_1$ represents the refractive index of the film, $\theta_1$ represents an incident angle of light, h represents the surface height, represents phase difference, and $\angle R$ represents a phase of total reflectivity.

11. An apparatus for measuring a thickness of a transparent film with a specific frequency range by using broad band interferometry within the frequency range, the apparatus comprising:
an interferometer that performs broad band interferometry within the frequency range and generates a correlogram; and
a computer that
performs a Fourier transformation to the correlogram to obtain a Fourier phase function;
removes a linear component of the Fourier phase function to obtain a non-linear component of the Fourier phase function;
applies a second integral transformation to the non-linear component to obtain an integral amplitude function of the non-linear component;
identifies a peak location of the integral amplitude function; and
determines the thickness of the film as a double value of an abscissa at the peak location considering a refractive index of the film which is dependent on wavelength,
wherein after the thickness of the film is determined, the thickness of the film is tested to determine whether the determined thickness is less than a threshold; and
when the determined thickness is less than the threshold, the non-linear component of the Fourier phase function is compared with a mathematical model of the non-linear component of the Fourier phase function as a function of the film thickness only, and the film thickness is determined to be the thickness for which the mathematical model of the non-linear component of the Fourier phase function is closest to the obtained non-linear component of the Fourier phase function.

12. The apparatus according to claim 11, wherein the interferometer comprises a light source for generating visible light.

13. The apparatus according to claim 12, wherein the visible light is white light.

14. The apparatus according to claim 11, wherein the computer calculates a surface height by substituting d in $$\Re(d,k) = \frac{r_1 + r_2\exp(-j2n_1kd\cos\theta_1)}{1 + r_1 r_2\exp(-j2n_1kd\cos\theta_1)} \approx \frac{r_1 + r_2\exp(-j2n_1kd)}{1 + r_1 r_2\exp(-j2n_1kd)},$$

with knowledge of $r_1$, $r_2$ and $n_1$ to obtain a phase, and
the computer calculates the surface height by substitution of the phase in $$\phi = -2kh + \Delta\phi = -2kh + \angle\Re(d,k),$$

wherein R respresents reflectivity, d represents the film thickness, k represents a wave number, $r_1$ and $r_2$ respectively represent reflectivities from upper and lower surfaces, j represents imaginary unit, $n_1$ represents the refractive index of the film, $\theta_1$ represents an incident angle of light, h represents the surface height, $\Delta\phi$ represents phase difference, and $\angle R$ represents a phase of total reflectivity.

15. The apparatus according to claim 11, the interferometer is any one of the Michelson, Mirau and Linnik type.

16. The apparatus according to claim 11, wherein the thickness of at least two films transparent with a specific frequency range is measured by using broad band interferometry within the frequency range.

17. A non-transitory computer readable media tangibly storing a program that causes a computer to:
perform a Fourier transformation to a correlogram to obtain a Fourier phase function;
remove a linear component of the Fourier phase function to obtain a non-linear component of the Fourier phase function;
applies an integral transformation to the non-linear component to obtain an integral amplitude function of the non-linear component;
identifies a peak location of the integral amplitude function of the integral amplitude diagram; and
determine a thickness of a film as a double value of an abscissa at the peak location considering a refractive index of the film which is dependent on wavelength,
wherein after the thickness of the film is determined, the thickness of the film is tested to determine whether the determined thickness is less than a threshold; and
when the determined thickness is less than the threshold, the non-linear component of the Fourier phase function is compared with a mathematical model of the non-linear component of the Fourier phase function as a function of the film thickness only, and the film thickness is determined to be the thickness for which the mathematical model of the non-linear component of the Fourier phase function is closest to the obtained nonlinear component of the Fourier phase function.

* * * * *

UNITED STATES PATENT AND TRADEMARK OFFICE
CERTIFICATE OF CORRECTION

PATENT NO. : 8,804,129 B2  
APPLICATION NO. : 13/464155  
DATED : August 12, 2014  
INVENTOR(S) : Ki-Nam Joo Page 1 of 1

It is certified that error appears in the above-identified patent and that said Letters Patent is hereby corrected as shown below:

In the Claims

Column 10, lines 44-45 (claim 5, lines 1, 2), please change "Fourier transform_transformation" to -- Fourier transformation --.

Column 11, line 40 (claim 10, line 18), please change "height, represents" to -- height, $\Delta\varphi$ represents --.

Column 11, line 5 (claim 8, line 9), "$\varphi = -2kh+\Delta\varphi = -2kh+\varphi\mathfrak{R}(d, k)$" to -- $\varphi = -2kh+\Delta\varphi = -2kh+\angle\mathfrak{R}(d, k)$ --.

Column 11, line 6 (claim 8, line 10), please change "R respresents" to -- $\mathfrak{R}$ represents --.

Column 11, line 12 (claim 8, line 16), please change "$\angle$R represents" to -- $\angle\mathfrak{R}$ represents --.

Column 11, line 35 (claim 10, line 13), please change "R respresents" to -- $\mathfrak{R}$ represents --.

Column 11, line 41 (claim 10, line 19), please change "$\angle$R represents" to -- $\angle\mathfrak{R}$ represents --.

Column 12, line 29 (claim 14, line 9), please change "R respresents" to -- $\mathfrak{R}$ represents --.

Column 12, line 35 (claim 14, line 15), please change "$\angle$R represents" to -- $\angle\mathfrak{R}$ represents --.

Signed and Sealed this  
Twenty-fourth Day of February, 2015

Michelle K. Lee  
*Deputy Director of the United States Patent and Trademark Office*